United States Patent
Harris et al.

(10) Patent No.: US 12,248,600 B2
(45) Date of Patent: Mar. 11, 2025

(54) PORTABLE REPUTATION BROKERING USING LINKED BLOCKCHAINS AND SHARED EVENTS

(71) Applicant: Visa International Service Association, San Francisco, CA (US)

(72) Inventors: Theodore D. Harris, San Francisco, CA (US); Tatiana Korolevskaya, Mountain View, CA (US); Yue Li, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 875 days.

(21) Appl. No.: 17/271,485

(22) PCT Filed: Aug. 28, 2019

(86) PCT No.: PCT/US2019/048596
§ 371 (c)(1),
(2) Date: Feb. 25, 2021

(87) PCT Pub. No.: WO2020/047116
PCT Pub. Date: Mar. 5, 2020

(65) Prior Publication Data
US 2021/0365584 A1 Nov. 25, 2021

Related U.S. Application Data

(60) Provisional application No. 62/724,163, filed on Aug. 29, 2018.

(51) Int. Cl.
*G06F 21/62* (2013.01)
*G06F 16/23* (2019.01)
(Continued)

(52) U.S. Cl.
CPC ...... *G06F 21/6245* (2013.01); *G06F 16/2379* (2019.01); *G06Q 30/018* (2013.01);
(Continued)

(58) Field of Classification Search
CPC ............. G06F 16/2379; G06F 21/6218; G06F 21/6245; G06F 21/64; G06Q 2220/10;
(Continued)

(56) References Cited

U.S. PATENT DOCUMENTS 10,990,693 B1 *  4/2021  Newman ............... G06F 21/602
2017/0177855 A1  6/2017  Costa Faidella et al.
(Continued)

FOREIGN PATENT DOCUMENTS

KR          101880175          7/2018

OTHER PUBLICATIONS

Application No. PCT/US2019/048596, International Search Report and Written Opinion, Mailed On Dec. 17, 2019, 14 pages.

*Primary Examiner* — Theodore C Parsons
(74) *Attorney, Agent, or Firm* — Kilpatrick Townsend & Stockton LLP

(57) ABSTRACT

Described herein are a system and techniques for enabling access control utilizing one or more blockchains associated with a user. A blockchain provider can manage one or more blockchains specifically associated with a an entity, where each blockchain may be associated with a differing sensitivity level. The entity may be a person or a machine such as an IOT (Internet of Things) device. The blockchain provider can manage access control policies associated with each blockchain such that access to the data of the blockchain may be allowed or restricted to requesting entities according to those access control policies.

16 Claims, 6 Drawing Sheets

(51) Int. Cl.
    *G06F 21/64*     (2013.01)
    *G06Q 30/018*     (2023.01)
    *G06Q 40/02*     (2023.01)
    *G06Q 50/26*     (2024.01)
    *H04L 9/00*     (2022.01)
    *H04L 9/32*     (2006.01)

(52) U.S. Cl.
    CPC ............... *H04L 9/32* (2013.01); *G06F 21/64* (2013.01); *G06Q 40/02* (2013.01); *G06Q 50/265* (2013.01); *G06Q 2220/10* (2013.01); *H04L 9/50* (2022.05)

(58) Field of Classification Search
    CPC .... G06Q 30/018; G06Q 40/02; G06Q 50/265; H04L 67/10; H04L 9/32; H04L 9/50
    See application file for complete search history.

(56) References Cited

U.S. PATENT DOCUMENTS

| | | | |
|---|---|---|---|
| 2017/0214675 A1 | 7/2017 | Johnsrud et al. | |
| 2017/0244721 A1 | 8/2017 | Kurian et al. | |
| 2017/0264428 A1 | 9/2017 | Seger, II | |
| 2019/0327081 A1* | 10/2019 | Ow ..................... | G06F 21/6245 |
| 2021/0365584 A1* | 11/2021 | Harris ..................... | H04L 67/10 |

* cited by examiner

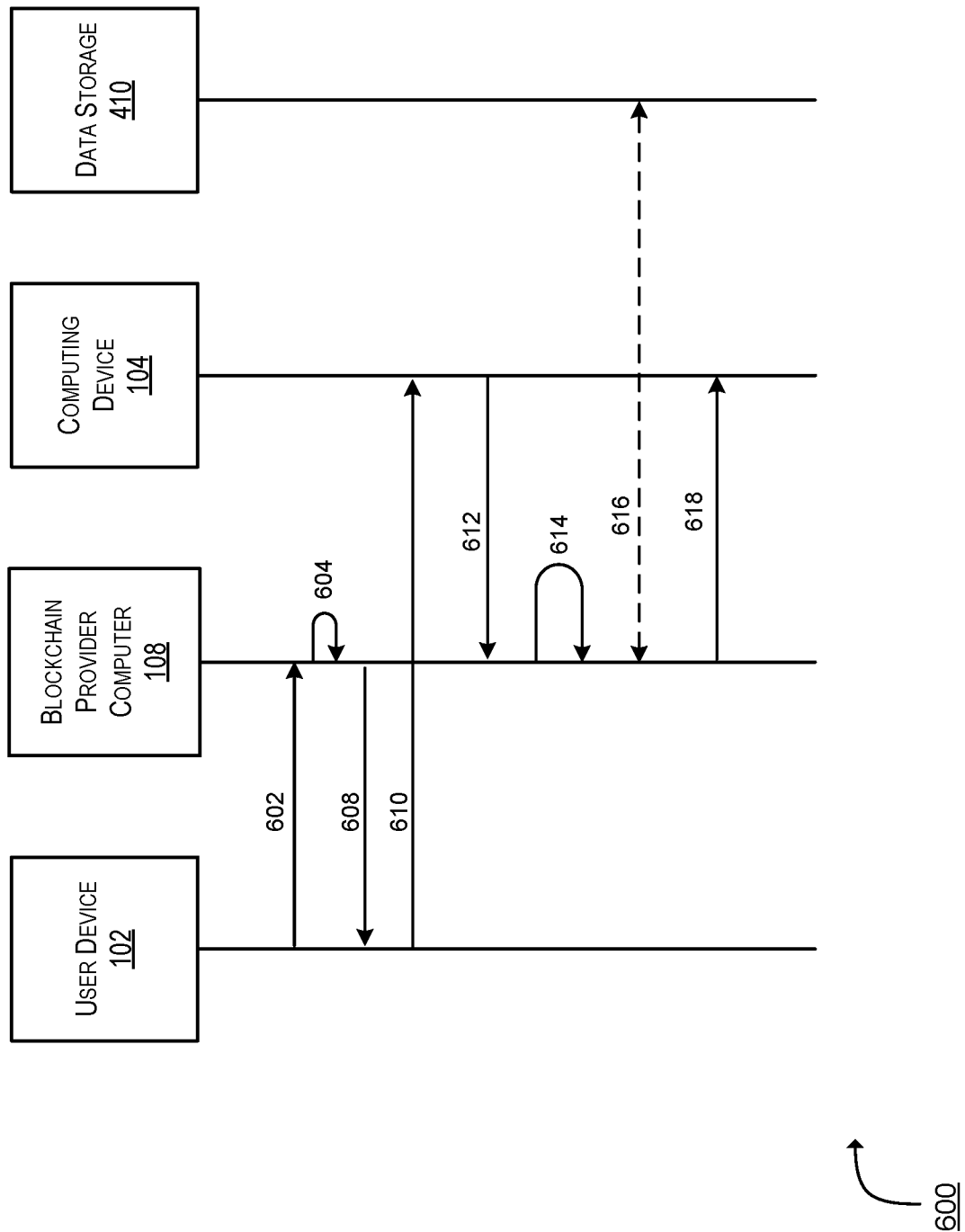

PORTABLE REPUTATION BROKERING USING LINKED BLOCKCHAINS AND SHARED EVENTS

CROSS-REFERENCE TO RELATED APPLICATIONS

This application is a U.S. National Phase Application of international patent application No. PCT/US2019/048596, filed Aug. 28, 2019, which claims priority to U.S. Provisional Patent Application No. 62/724,163, filed on Aug. 29, 2018, the disclosures of which are herein incorporated by reference in their entirety for all purposes.

BACKGROUND

There is growing public concern regarding the security of sensitive user data. Currently, user may have little control on what entities may view their data and/or how their data may be used. A user's sensitive data may be proliferated, misused, and/or misappropriated. As the power of machine learning increases and the need for privacy grows, a new approach to managing sensitive data is needed.

Conventionally, a user's sensitive data may be utilized to quantify the individual's risk, credit worthiness, and/or reputation. However, current methods and systems rely on static scores that contain no additional information to enable deep understanding of the context of the static score. Also the score is not portable in a sense a user could receive the score, keep the score, and use the score as a means to prove reputation.

Conventional blockchain processing systems are also slow. A conventional blockchain system may contain the data of all users of a system. To verify a blockchain that contains interactions conducting by a single user, data in the entire blockchain needs to be verified. When there are thousands of interactions by millions of users on a single blockchain, verifying the the blockchain can take a significant amount of time.

Embodiments of the invention address these and other problems, individually and collectively.

BRIEF SUMMARY

Embodiments of the invention include techniques for enabling users to control which entities are given access to data associated with the user as well as the type of data to which the entity is provided access. The data structures and computer architectures also allow users to quickly verify resource providers, and for resource providers to quickly verify users to allow interactions between users and resource providers to occur more quickly.

An embodiment of the disclosure is directed to a method. The method may include obtaining sensitive data associated with an entity. The method may include generating one or more personal blockchains associated with the entity. In some embodiments, the one or more personal blockchains store corresponding portions of the sensitive data associated with the entity. The method may include managing access to the one or more personal blockchains according to one or more access control policies. The method may include receiving, from a computing device, an access request to access the one or more personal blockchains associated with the entity. The method may include allowing access by the computing device to the one or more personal blockchains associated with the entity based at least in part on the access control policies.

Another embodiment of the disclosure is directed to a blockchain provider computer comprising a processor, a memory, and a computer readable medium coupled to the processor, the computer readable medium comprising code that, when executed by the processor, causes the blockchain provider computer to perform operations. The operations may include obtaining sensitive data associated with an entity. The operations may include generating one or more personal blockchains associated with the entity. In some embodiments, the one or more personal blockchains store corresponding portions of the sensitive data associated with the entity. The operations may include managing access to the one or more personal blockchains according to one or more access control policies. The operations may include receiving, from a computing device, an access request to access the one or more personal blockchains associated with the entity. The operations may include allowing access by the computing device to the one or more personal blockchains associated with the entity based at least in part on the access control policies.

Another embodiment of the disclosure is directed to a method. The method may include providing, by a user device, one or more personal blockchains to a resource provider computer. In some embodiments, the resource provider computer performs verification of the one or more personal blockchains, generates a resource provider response message based on the verification, and transmits the resource provider response message to the user device. The method may further include receiving, by the user device, the resource provider response message.

These and other embodiments of the invention are described in further detail below as well as in the attached appendix.

BRIEF DESCRIPTION OF THE DRAWINGS

FIG. 6 depicts a swim lane diagram illustrating another exemplary method for accessing sensitive data from one or more blockchains according to one or more access control policies, in accordance with at least one embodiment.

DETAILED DESCRIPTION

Figure 1:
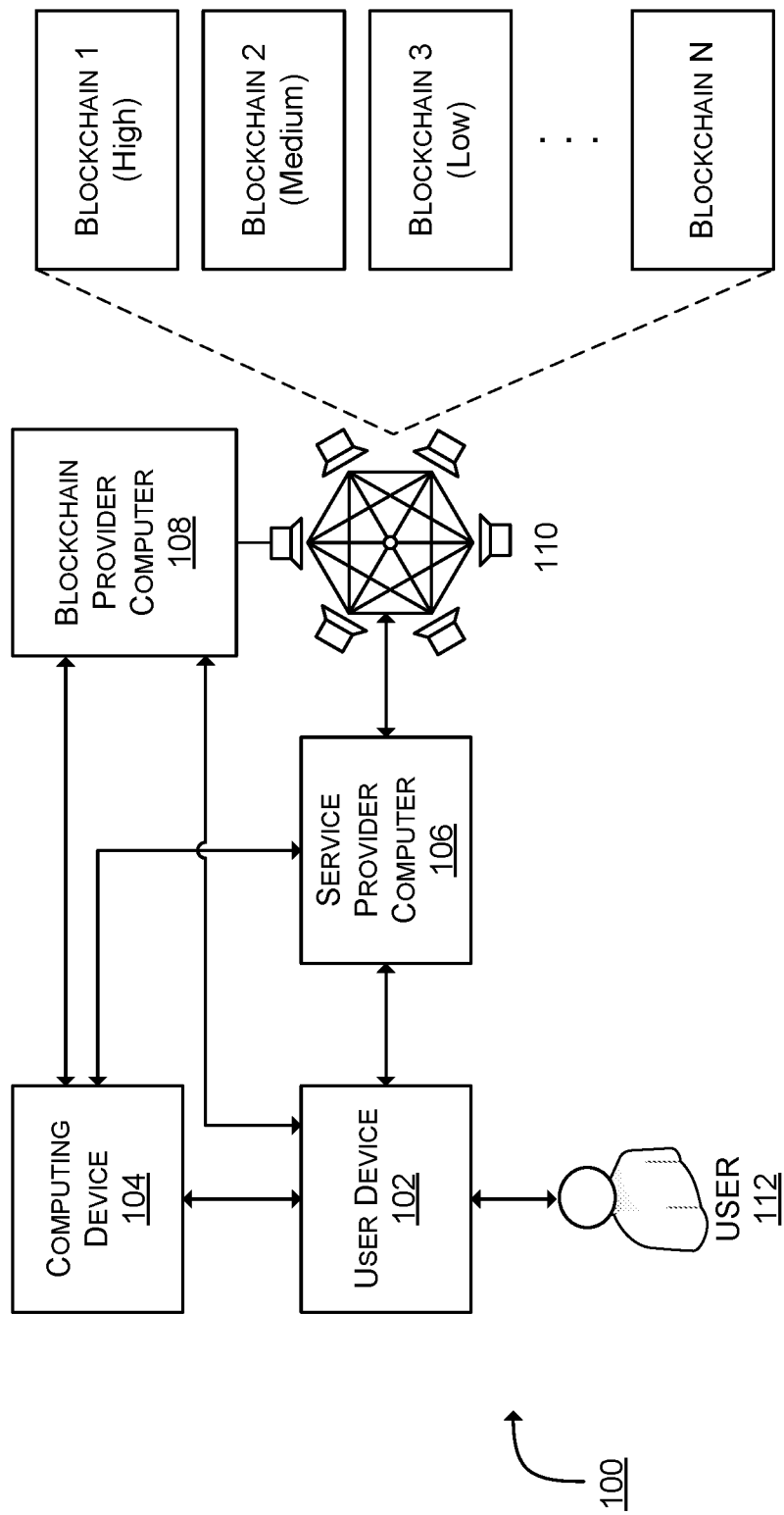
FIG. 1 depicts an example system architecture that may be implemented to enable controllable access to private data in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "computing device" can be any suitable device or software module that is configured to process data. In some embodiments, a computing device may include communication capabilities such as using a mobile phone (wireless) network, wireless data network (e.g. 3G, 4G or similar networks), Wi-Fi, Wi-Max, or any other communication medium that may provide access to a network such as the Internet, an overlay network, or the like. Examples of computing devices include mobile phones (e.g. cellular phones), PDAs, tablet computers, net books, laptop computers, personal music players, hand-held specialized readers, server computers, etc. A computing device may comprise any suitable hardware and software for performing such functions, and may also include multiple devices or components (e.g. when a device has remote access to a network by tethering to another device—i.e. using the other device as a modem—both electronic devices taken together may be considered a single computing device).

A "user device" may be a computing device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "blockchain" can be a distributed database that maintains a continuously-growing list of records secured from tampering and revision. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header.

A "block header" can be a header including information regarding a block. A block header can be used to identify a particular block an a blockchain. A block header can comprise any suitable information, such as a previous hash, a Merkle root, a timestamp, a nonce, and a Merkle mountain range root. In some embodiments, a block header can also include a difficulty value.

A "personal blockchain" can be a blockchain that is personal to an entity. A personal blockchain can include only information pertaining to a specific entity, such as a specific user. Such information may include static data (e.g., social security numbers, phone numbers, addresses, etc.) and/or may include interaction data such as information about purchase transactions, access transactions etc., associated with the user. As a personal blockchain is specific to a particular entity and need not contain data regarding multiple entities, the size of a personal blockchain is significantly smaller in size than general blockchains.

A "permissioned blockchain" (also referred to as a "private blockchain") may include a blockchain that is accessed according to a set of permissions. "Permissions" can specify that certain actions can or cannot be performed by certain entities. When used in the context of a permissioned blockchain, these permissions can control a blockchain participant's transactions and defines rules for how a participant can access and/or contribute to the blockchain. By way of example, a particular entity's permissions can specify that the entity can read data of a particular permissioned blockchain, but cannot write or delete data from that blockchain.

An "access control policy" is a policy that defines how access to data is to be controlled. An access control policy can be used to minimize the risk of unauthorized access to data. By way of example, an access control policy can include permissions that specify what data and/or what type of data may be accessed by particular entities. An access control policy may further specify whether access requires authentication and/or authorization of the accessing entity.

An "access request" may be a data message that includes and/or indicates a request for particular data. An access request may be in any suitable form and/or format.

An "interaction" may refer to a reciprocal action or influence. An interaction can include a communication, contact, or exchange between parties, devices, and/or entities. Example interactions include a transaction between two parties and a data exchange between two devices. Interactions can also be agreements, contracts, and the like.

A "cryptographic key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptographic key pair" may include a pair of linked cryptographic keys. For example, a key pair can include a public key and a corresponding private key. In a cryptographic key pair, a first cryptographic key (e.g., a public key) may be used to encrypt a message, while a second cryptographic key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair algorithm.

A "decentralized network" can include a network in which no one single computing device or software module has control over all of the processing of the network. A "centralized network" may include a network in which a single computing device or node (or a relatively small number of the same) controls the processing of the network. Between the two, a decentralized network may be less likely to fail accidentally because it relies on many separate components that are not likely to fail at once. Additionally, decentralized systems are more expensive to attack and destroy or manipulate than centralized networks because decentralized networks lack sensitive central points that can be attacked at much lower cost than the economic size of the surrounding system. Additionally, it may be significantly more difficult for participants in a decentralized networks to collude to act in ways that benefit them at the expense of other participants.

A "node" or "network node" may include a connection point in a communication network. In some embodiments, a network node can be a physical electronic device that is capable of creating, receiving, or transmitting data (e.g., a server). In some embodiments, a network node may be a computing device within a record-keeping network (e.g., a blockchain network). A network node may be able to create a data package (e.g., a data payload), transfer a data package, receive a data package, validate a data package, access a central record, and/or perform any other suitable functions. Different types of network nodes may be able to perform different sets of functions within a recording network. In some embodiments, a network node may be associated with and/or operated by a resource provider such as an online service provider, a content provider, a certificate authority, a financial institution (e.g., a bank), a merchant, a transaction processing network, or any other suitable entity.

A "record" may include evidence of one or more interactions. A digital record can be electronic documentation of an interaction. A record can include a record identifier and record information. For example, record information can include information describing one or more interactions and/or information associated with the interactions (e.g., a digital signature). Record information can also include multiple data packets each of which include different data describing a different interactions. A record identifier can be a number, title, or other data value used for identifying a record. A record identifier can be nondescript, in that it may not provide any meaningful information about the information included in the record. Examples of records include medical records, academic records, transaction records, credential issuance records, etc. In some embodiments, a record can be stored in a block of a blockchain. In these embodiments, an individual block may include an individual record or a predetermined number of records, and a blockchain can be a series of records organized into blocks.

"Sensitive data" can be any suitable data for which access control is desirable. By way of example, sensitive data can include bank account information, user identification information (e.g., name, address, phone number, social security number, etc.), transaction data (e.g., purchase transactions, etc.), access data, location data (e.g., GPS locations visited, etc.), social media data, to name a few.

A "sensitivity level" can indicate a level of sensitivity associated with sensitive data. A level of sensitivity can indicate how potentially detrimental it would be should the data be accessed by an unauthorized user. Examples of sensitivity levels can include, but are not limited to a low sensitivity level, a medium sensitivity level, and/or a high sensitivity level.

A "sensitivity level threshold" can be a value (e.g., a sensitivity level) that indicates a threshold corresponding to sensitivity levels. In some embodiments, a sensitivity level threshold may be utilized in an access control policy to indicate one or more sensitivity levels of data to which an entity is to be granted access. By way of example, an access control policy may indicate a sensitivity level threshold of "high" corresponding to a particular entity. Accordingly, the entity may be granted access to data having a sensitivity level of "high" and, in some cases, any data having a sensitivity level that is less than "high" (e.g., a medium sensitivity level, a low sensitivity level, etc.).

A "rule set" may be a set of rules that govern some actions. If the rule set is predefined (e.g., determined before run time), the rule set may be referred to as a "predefined rule set." Some rules can define certain conditions that need to be met for an action to occur. By way of example, a rule can specific that if data includes a social security number (e.g., a number having a particular format and/or labeled as a social security number) the portion of the data and/or the data in its entirety is to be associated with a high sensitivity level. A rule set may include any suitable number of rules.

A "digital signature" may include a value that may be utilized to verify the authenticity of digital messages. A valid digital signature may give a recipient reason to believe was created by a known sender, that the sender cannot deny having sent the message, and that the message was not altered in transit. A digital signature may include an electronic signature for a message or some data. A digital signature may be a numeric data value, an alphanumeric data value, or any other type of data including a graphical representation. A digital signature may be a unique data value generated from a message and a private key using an encrypting algorithm. In some embodiments, a validation algorithm using a public key may be used to verify the signature.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing. In some examples of verification described in the disclosure, electronic records may be signed using a private key and verified using a public key.

A "verification request message" may be a data message that includes and/or indicates a request for data verification. An verification request may be in any suitable form and/or format. A verification request may include the data for which verification is requested and/or a storage location from which that data may be accessed.

A "verification response message" may be a data message that includes and/or indicates a response to a verification request. A verification response may include an indication that the data requests is either verified or not verified.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "entity" may include a thing with a distinct and independent existence. Examples of entities may include users, machines, or organizations.

A "resource provider" may be an entity that can provide a resource such as goods, services, information, and/or access. Examples of resource providers includes merchants, access devices, secure data access points, data providers, transit agencies, governmental entities, venue and dwelling operators, etc. A resource provider may operate a client device. A merchant may typically be an entity that engages in transactions and can sell goods or services, or provide access to goods or services.

A "resource provider response message" may be a message provided by a resource provider that indicates a response to an action. By way of example, a resource provider may provide a resource provider response message in response to receiving and verifying one or more personal blockchains provided by a user device. A resource provider response message may be in any suitable format and may include any suitable data. By way of example, a resource provider response message may include details corresponding to an offer. An offer may include any suitable terms and/or conditions and can be considered an invitation to the receiver of the offer to accept or reject the provided terms and/or conditions.

A "data request" may be a message that includes and/or indicates a request for data. A data request may indicate the specific data requested (e.g., contact information such as the user's name, address, phone number, social security number, tax identification number, etc.). A data request may include an identifier for the data owner and an identifier for the requesting user/entity. A data request may be in any suitable form and/or format.

A "data response" may be a message that includes and/or indicates a response to a data request. A data response may indicate the specific data requested (e.g., contact information such as the user's name, address, phone number, social security number, tax identification number, etc.). A data response may include an identifier for the data owner and an identifier for the requesting user/entity. A data response may be in any suitable form and/or format.

A "merchant" may typically be an entity that engages in transactions and can sell goods or services, or provide access to goods or services.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc.

Details of some embodiments of the present invention will now be described in greater detail.

FIG. 1 depicts an example system 100 for implementing at least some embodiments of the current disclosure. The system 100 may include user device 102, computing device 104, service provider computer 106, and blockchain provider computer 108. Although a certain number of components are presented in FIG. 1, it should be appreciated that the techniques described herein can be performed with a more or fewer components. In some embodiments, the functionality of the service provider computer 106 and the blockchain provider computer 108 can be performed by the same component. In some embodiments, the blockchain provider computer 108 can operate as a node of the blockchain network 110.

The components presented in FIG. 1 may be in communication with one another via any suitable such as the Internet, intranets, local area networks, cellular networks, wired networks, wireless networks, or the like.

In some embodiments, the user device 102 may be any suitable electronic device operated by user 112 and capable of collecting and transmitting information. For example, the user device 102 may be a mobile phone, a smart phone, a personal digital assistant (PDA), a laptop computer, a desktop computer, a fitness tracker, or any other suitable electronic device. Similarly, the computing device 104 may be any suitable electronic device operated by an entity (e.g., another user, a resource provider such as a merchant, a financial institution such as a bank, a friend, a family member, etc.). The computing device 104 can also be a mobile phone, a smart phone, a personal digital assistant (PDA), a laptop computer, a desktop computer, a fitness tracker, or any other suitable electronic device.

The service provider computer 106 may be any electronic device capable of performing at least a portion of the functionality described herein. Although depicted in FIG. 1 as being separate from the blockchain network 110, it should be noted that the service provider computer 106 may be a network node of the blockchain network 110 in some embodiments. The service provider computer 106 may be configured to provide one or more interfaces with which computing device 104 and user device 102 may interact. In some embodiments, the user device 102 and the computing device 104 may be in communication with one another, while in other embodiments, the devices may communicate with one another via the service provider computer 106. In some embodiments, the service provider computer 106 may provide these user interfaces to enable the user 112 and/or the entity associated with the computing device 104 to provide requests and receive information from the blockchain network 110. In some embodiments, the service provider computer 106 may be operated on behalf of the same entity that may be associated with the computing device 104 or the service provider computer 106 may be associated with a different entity (e.g., a provider of the blockchain network 110).

The blockchain network 110 may be any suitable combination of one or more electronic devices (e.g., including blockchain provider computer 108) configured to store data (e.g., sensitive data) within one or more blockchains (e.g., blockchains 1-N). In some embodiments, one or more of the blockchains 1-N may be private blockchains. For example, in some embodiments, blockchains associated with medium and/or high sensitivity may be permissioned blockchains and blockchains associated with a low sensitivity may be public blockchains (e.g., accessible by any entity). In some embodiments, all of the blockchains 1-N may be permissioned blockchains.

The blockchain network 110 may be a decentralized or centralized network. In some embodiments, the blockchain network 110 may maintain a mapping of one or more blockchains (e.g., identified with a blockchain identifier) to a particular user (e.g., user 112). By way of example, blockchains 1-3 may be associated with the user 112, while the remaining blockchains managed by the blockchain network 110 may be associated with other users. In some embodiments, the mapping may identify the blockchain identifier of an associated blockchain as well as an indicator of the level of sensitivity associated with the blockchain. For example, blockchain 1 may be associated with a high level of sensitivity, blockchain 2 with a medium level of sensitivity, and blockchain 3 with a low level of sensitivity. A level of sensitivity is intended to refer to a degree by which the data would be potentially damaging if accessed by an unauthorized entity. In some embodiments, the sensitivity level may refer to a legal or contractual limitation on the data usage. In some embodiments, the sensitivity level may correspond to a degree of anonymity of the data. By way of example, blockchain 1 associated with a high level of sensitivity may include data for a particular merchant, blockchain 2 associated with a medium level of sensitivity may store data on the merchant's community group, and blockchain 3 associated with a low level of sensitivity could store data summarized by merchant type.

In at least some of these embodiments, each blockchain ledger of the blockchain network 110 may store access control policy data. Assuming the blockchains 1-3 are associated with the user 112, the user 112 may add or revoke access to these blockchains for the entity associated with the computing device 104. By way of example, the user device 102 may utilize any suitable interface provided by the service provider computer 106 to indicate a level of access and/or one or more particular blockchains to which access by the entity associated with the computing device 104 is to be allowed. In some embodiments, access control policy data (e.g., indicating that access is to be allowed for the entity, or a level of access allowed for the entity, etc.) may be stored in any of the blockchains 1-3 associated with the user 112. In some embodiments, the access control policies associated with a user's blockchains may be stored as a record separate from the blockchains associated with the user. For example, the access control policies for a given blockchain may be stored in a mapping that identifies, the user, the blockchain, and one or more access control policies for allowing and/or restricting one or more entities from the blockchain.

In an illustrative scenario, the user device 102 may access interfaces provided by the service provider computer 106 and/or the blockchain provider computer 108 to request blockchain management by the blockchain network 110. In some embodiments, the user 112 can request more than one blockchain having differing levels of sensitivity. In other embodiments, the blockchain provider computer 108 can be configured to automatically, or in response to identifying the user 112 has opted into a blockchain service, maintain one or more blockchains of potentially varying sensitivity on behalf of the user. The information stored on the blockchain may be collected in a number of ways. In some embodiments, the user 112 may provide information to the blockchain provider computer 108 directly. In some embodiments, the blockchain provider computer 108 can participate in and/or access one or more processing network computers associated with financial transaction processing.

As a specific illustration, the user 112 may be an example of an entity and the user may have a personal blockchain 1 that has interactions involving only low sensitivity data that is specifically associated with the user. For example, the low sensitivity data may include the home name of the user, the home address of the user, the user's sex, and the occupation of the user. Such information may be considered low sensitivity (e.g., corresponding to a low sensitivity level), since such information can be readily obtained from the user's public behavior or from public records. The blockchain provider computer 108 may store a first access control policy, which allows any entity with a legitimate, specific purpose, to obtain the personal blockchain 1. Specific purposes might include marketing or notifications regarding public service announcements. The user may also have a personal block chain 2 of interactions involving medium sensitivity data of the user. For example, medium sensitivity data may include the user's age, cellular phone number, and spouse's name. Such information may be considered medium sensitivity, since such information cannot be readily obtained from the user's public behavior or from public records, but knowledge of such information is generally not considered to be potentially detrimental to the user. The blockchain provider computer 108 may maintain a second access control policy which states that only entities that have previously or currently obtained the user's permission will be allowed to access the personal blockchain 2. The user may also have a personal blockchain 3 for storing interactions involving secure information. Such information may include a passport number, social security number, annual income, drivers license number, etc. Such information is generally considered sensitive and the unauthorized use of such information can be detrimental to the user. The blockchain provider computer 108 may have a third access control policy which only releases blockchain 3 if the user has previously authorized its release and the user has also recently authenticated herself to the blockchain provider computer 108 in conjunction with the request to release blockchain 3 to the requesting resource provider.

Although not depicted, a processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network, including the Internet.

In some embodiments, the blockchain provider computer 108 may obtain sensitive data from one or more financial institutions (e.g., one or more financial transactions involving the user 112, loans of the user 112, account data such as account balances and the like, or any suitable information associated with the user). The blockchain provider computer 108 may additionally or alternatively obtain sensitive data associated with the user for a social media platform, building access systems, location systems, from one or more credit bureaus, from the user device 102 directly, and/or any suitable information from any suitable source.

In some embodiments, the blockchain provider computer 108 may be configured to identify data as being related to a particular sensitivity level. By way of example, the blockchain provider computer 108 may associate a social security number with a high sensitivity level, a user's address with a medium sensitivity level, and a financial transaction (e.g., the user purchased gas at gas station X on Apr. 1, 2019) with a low sensitivity level. In some embodiments, the blockchain provider computer 108 may identify portion of a data instance (e.g., a transaction) as having data belonging to differing sensitivity levels. By way of example, transaction data resulting from a transaction may be segmented. One segment (e.g., portion) of the transaction include the merchant name may be associated with a low sensitivity level while the date and time of the transaction and the price may be associated with a medium sensitivity level. In some embodiments, a payment token and/or account number of the transaction may be associated with a high sensitivity level. Once an association is determined, the blockchain provider computer 108 (or any suitable computer of the blockchain network 110) may be configured to store the corresponding data in a block of a corresponding blockchain associated with the user. For example, data determined to be associated with a high sensitivity level may be stored by the blockchain network 110 in the blockchain 1 (associated with a high sensitivity level). Data determined to be associated with a medium sensitivity level may be stored by the blockchain network 110 in the blockchain 2 (associated with a medium sensitivity level). Data determined to be associated with a low sensitivity level may be stored by the blockchain network 110 in the blockchain 3 (associated with a low sensitivity level). It should be appreciated that any suitable number of blockchains may be associated with the user and that "low," "medium," and "high" designations are used for illustrative purposes only and are not intended to limit the scope of this disclosure.

In some embodiments, the computing device 104 may similarly access and/or request the blockchain functionality provided by the blockchain network 110. Thus, the blockchain network 110 may generate and manage one or more additional blockchains on behalf of the entity associated with the computing device 104. In some embodiments, these blockchains may store differing levels of sensitive data associated with the entity. The entity may be a resource provider such as a data provider, a merchant, an entity that provides access to a secure location.

In some embodiments, the blockchains associated with the user 112 and the blockchains associated with the entity may be utilized to prove reputation and/or credit worthiness of the user 112 and the entity, respectively. In some embodiments, the user device 102 may be provided the blockchains associated with the user 112. These blockchains may be communicated from the user device 102 to the computing device 104 directly or via the service provider computer 106. By way of example, the user device 102 may be utilized to access a website for requesting a loan from a financial institution associated with the computing device 104. The service provider computer 106 may be configured to host the website. The user device 102 may provide previously obtained blockchains associated with the user 112 to the service provider computer 106 and/or to the computing device 104 directly. Similarly, the computing device 104 may provide one or more blockchains to the user device 102 directly, or via the service provider computer 106. In some embodiments, a recipient device may transmit the blockchain to the blockchain provider computer 108 for verification. In some embodiments, the blockchain may be transmitted in a verification request message. If verified, the recipient device may be provided the blockchain data from the blockchain network 110 (e.g., via blockchain response message).

In some embodiments, the user device 102 and/or the computing device 104 do not provide blockchains directly to the other device. Rather, the user device 102 may request (e.g., via the service provider computer 106 and/or the blockchain provider computer 108) that the entity associated with the computing device 104 be provided access to one or more blockchains associated with the user 112. In some embodiments, the request may indicate that the entity is to be provided access to all blockchains at or below a sensitivity threshold. By way of example, if the entity is to be given "medium sensitivity" access, the entity may be allowed to access any blockchains of the user that are associated with medium sensitivity or lower (e.g., low sensitivity). The computing device 104 may similarly be used to request that the user/user device 102 be given access to one or more blockchains associated with the entity. The blockchain network 110 may be configured to generate one or more access control policies to document which entities/users are allowed to access a given blockchain. In some embodiments, a sensitivity threshold may be maintained as an association to the entity/user associated with one or more blockchains and this sensitivity threshold may be utilized to allow and/or restrict access to any suitable number of blockchains. In some embodiments, the blockchain network 110 may be configured to allow and/or restrict access of the user device 102 and/or the computing device 104 according to these access control policies and/or sensitivity thresholds (which may also be considered an access control policy).

Figure 2:
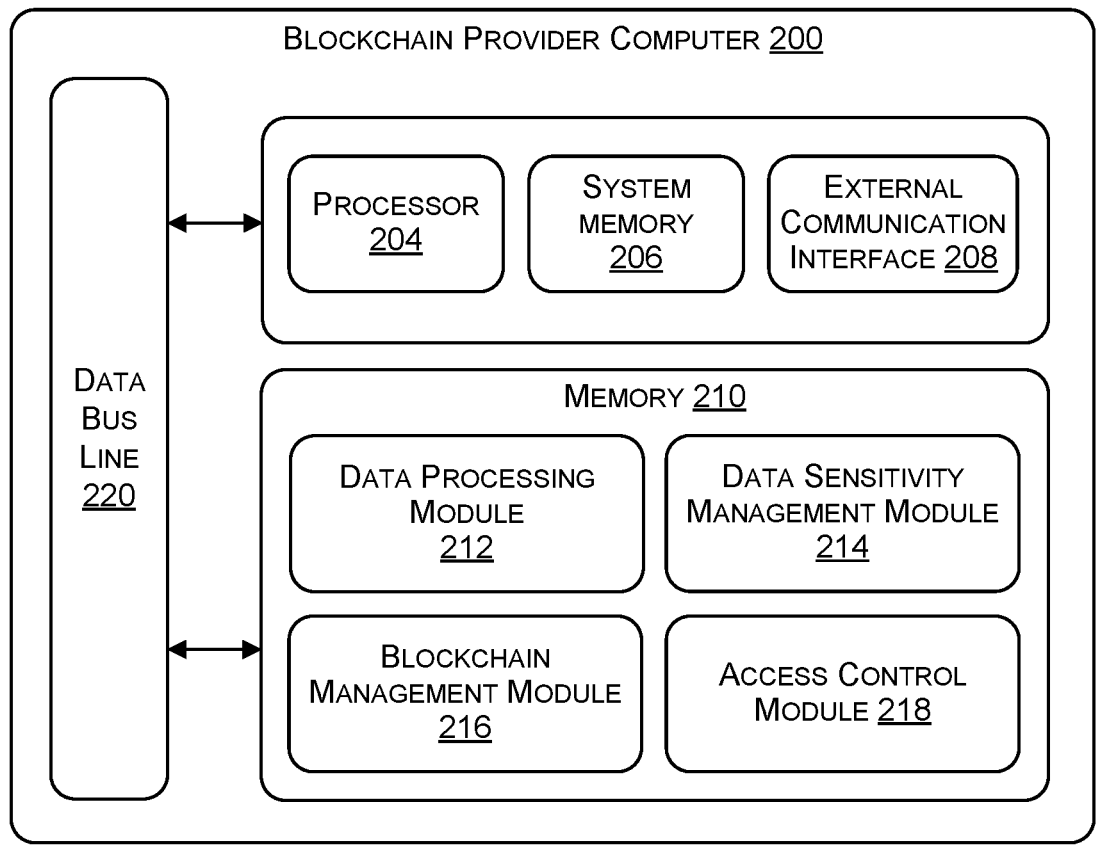
FIG. 2 illustrates a block diagram of a blockchain provider computer, in accordance with at least one embodiment.

FIG. 2 illustrates a block diagram of a blockchain provider computer 200 (e.g., an example of the blockchain provider computer 108 of FIG. 1), in accordance with at least one embodiment. The blockchain provider computer 200 is illustrated as comprising a plurality of hardware and software modules. However, it should be appreciated that this is provided for illustration purposes only, and each of the modules and associated functionality may be provided and/or performed by the same or different components. That is, the blockchain provider computer 200 may perform some of the relevant functions and steps described herein with reference to the blockchain provider computers 108 through the use of any suitable combination of software instructions and/or hardware configurations. It should be noted that although FIG. 2 illustrates all of the modules located on a single device, this disclosure is not meant to be so limited. Moreover, a system for implementing the functionality described herein may have additional components or less then all of these components. Additionally, some modules may be located on other devices such as a remote server or other local devices that are functionally connected to the server computer component(s). In some cases, the software modules may be located on a virtual machine or a container.

The blockchain provider computer 200 may be a server computer (e.g., a server computer operating in a cloud computing environment). The blockchain provider computer 200 is shown as comprising a processor 204, system memory 206 (which may comprise any combination of volatile and/or non-volatile memory such as, for example, buffer memory, RAM, DRAM, ROM, flash, or any other suitable memory device), and an external communication interface 208. Moreover, one or more of the modules 212-218 may be disposed within one or more of the components of the system memory 210, or may be disposed externally. As was noted above, the software and hardware modules shown in FIG. 2 are provided for illustration purposes only, and the configurations are not intended to be limiting. The processor 204, system memory 206 and/or external communication interface 208 may be used in conjunction with any of the modules 212-218 described below to provide a desired functionality. Some exemplary modules and related functionality are provided below.

A data processing module 212 may be configured or programmed to perform some or all of the functionality associated with receiving, sending, and generating electronic messages for transmission at the blockchain provider computer 200 to or from any of the entities shown in FIGS. 1 and 4-6 (e.g., a user device, a computing device, a service provider computer, etc.). When an electronic message is received by the blockchain provider computer 200 via the external communication interface 208, it may be passed to the data processing module 212. The data processing module 212 may identify and parse the relevant data. The data processing module 212 may then transmit any received information to an appropriate module within the blockchain provider computer 200 (e.g., via a data bus line 220). The data processing module 212 may also receive information from one or more of the modules in the blockchain provider computer 200 and generate an electronic message in an appropriate data format used by the blockchain provider computer 200 so that the message may be sent to one or more entities within system (e.g., the user device(s), the computing device(s), and/or the service provider computer(s) of FIGS. 1 and 4-6). The electronic message may then be passed to the external communication interface 208 for transmission.

A data sensitivity management module 214 may be configured to cause the processor 204 to identify a data sensitivity level for a given data instance. In some embodiments, the data sensitivity management module 214 may utilize a predefined rule set to identify a data sensitivity level for a given data instance. For example, the rules set may set a number of conditions which, when met, indicate a particular sensitivity level. By way of example, the rules set may define that when data includes a user's address, the data may be associated with a "medium sensitivity" label. As another example, the rules set may define that when the data includes a user's social security number, the data may be associated with a "high sensitivity" label. As yet another example, the rules set may define that data that is not determined to be medium or high sensitivity may be labeled with a "low sensitivity" label. The rules may be numerous and may vary. It should also be appreciated that a single data instance having numerous fields (e.g., a transaction including a merchant name, account identifier, user identifier, price, transaction type, time, date, etc.) may be utilized to generate multiple instances of data that is associated with differing levels of sensitivity. In some embodiments, a data instance (e.g., a transaction, a record, a document, etc.) can be divided into multiple portions. By way of example, the data sensitivity management module 214 can identify certain data fields/portions as being associated with low sensitivity, other data fields/portions of data as being associated with medium sensitivity, and still other data fields/portions as being associated with high sensitivity. As a non-limiting example, a transaction including data fields such as a merchant name, merchant address, account identifier, user identifier, price, transaction type, time, data, and the like, may be divided such that low sensitive data fields (e.g., merchant name, user identifier, transaction type) may be stored in a first blockchain associated with the user and corresponding to a low sensitivity level. Another set of data fields including the medium sensitivity data fields (merchant address, price, time, and date) and, in some cases, the low sensitivity data may be stored in a second blockchain associated with the user and corresponding to a medium sensitivity level. Yet another set of data fields including the high sensitivity data fields (account number) and, in some cases, the low and/or medium sensitivity data may be stored in a third blockchain associated with the user and corresponding to a high sensitivity level. The use of three blockchains is intended to be illustrative only. More or fewer blockchains may be utilized.

In some embodiments, the data sensitivity management module 214 may train and/or manage/utilize a machine-learning model to identify the sensitivity level to be associated with one or more data fields. By way of example, a training data set may be obtained that includes any suitable number of data instances for which one or more sensitivity levels are predefined. As an example, the training set could include a collection of documents where each document and/or portions of documents are labeled with predefined sensitivity levels. The training set could additionally or alternatively include financial transactions for which the transaction and/or data fields of the transactions are labeled with predefined sensitivity levels. The training set could additionally or alternatively include social media data (e.g., social media posts) of any suitable number of users for which the sensitivity levels are predefined for each instance of data and/or portion of data. For example, text from a post could be associated with a low sensitivity level, while an image included in the post could be associated with a high sensitivity level. The training data set could conceivably utilize any suitable data that has been labeled with predefined sensitivity levels. Each instance of data may include multiple portions that could also be labeled with predefined sensitivity levels. The data sensitivity management module 214 could apply any suitable machine-learning algorithm such as a supervised machine-learning algorithm to train a model to identify sensitivity levels/labels for each instance of data and/or one or more portions of each instance of data. In some embodiments, the data sensitivity management module 214 may verify the accuracy of the model by inputting data instances of the training data set and verifying that the levels identified and/or labels identified by the model match those provided in the training data set. The data sensitivity management module 214 can add instances of subsequent data labeled by the model to the training data set and retrain and/or incrementally update the model over time such that the identification of sensitivity levels is improved over time.

The blockchain management module 216 may be configured to cause the processor 204 to generate and/or manage one or more blockchains. As described herein, the blockchain management module 216 may be configured to cause the processor 204 to manage one or more blockchains associated with a user or entity. In some embodiments, the blockchain management module 216 may receive data from the data sensitivity management module 214 for which sensitivity levels/labels have been identified. The blockchain management module 216 may cause the processor 204 to analyze the received data to identify a number of sensitivity levels of the data. If a blockchain associated with the user and corresponding to a the sensitivity level of the data is not currently in existence, the blockchain management module 216 may cause the processor 204 to generate a blockchain. The blockchain may be associated with the user and may correspond to a particular sensitivity level/label. In some embodiments, a user identifier and/or a sensitivity level/label may be embedded in a genesis block or other block of the blockchain as described in connection with FIG. 3. In some embodiments, the blockchain management module 216 may assign a blockchain identifier to the blockchain and associated the blockchain identifier with an identifier associated with the user. In some embodiments, a sensitivity level may also be assigned to the blockchain. The blockchain identifier, the user identifier, and the sensitivity level corresponding to the blockchain may be associated and the association (e.g., a mapping) may be stored in a storage location accessible to the blockchain network 110 of FIG. 1 (including the blockchain provider computer 200).

The blockchain management module 216 may receive and/or obtain any suitable data associated with a user from a computing device associated with the user (e.g., the user device 102 of FIG. 1) in a request initiated by a user and/or from any suitable data source (e.g., a transaction processing network, a database, a banking system, a merchant system, or the like).

In some embodiments, the access control module 218 may cause the processor 204 to manage access to the one or more blockchains managed by the blockchain management module 216. In some embodiments, the access control module 218 may receive a request for data (e.g., initiated by an entity associated with the computing device 104 of FIG. 1) via the data processing module 212. If access control policies are stored in blocks of the blockchains, the access control module 218 may be configured to identify an access control policy within the blockchain which corresponds to the requestor. In some embodiments, the data request may indicate particular data (or all data associated with a user or entity) to which access is requested. In some embodiments, the access control module 218 may verify that an access control policy indicates that the requestor is to be allowed and/or restricted access to the particular data (or all data). By way of example, a user may have previously requested that a particular entity be provided access to data corresponding to medium sensitivity (and in some cases any data having a lower sensitivity level such as low sensitivity). If the entity requests access to a blockchain associated with the user and corresponding to a medium sensitivity level (or in some cases a low sensitivity level), the access control module 218 may verify that the access control policy stored in a blockchain associated with the user and corresponding to the medium sensitivity level (and/or a blockchain associated with the user and corresponding to a low sensitivity level) indicates that the entity is to be allowed access. If an access control policy is not found, or the access control policy identifies the entity is to be restricted access, the access control module 218 may be configured to cause the processor 204 to deny the request.

In some embodiments, when the access control policies are stored separate from the blockchain(s), the access control module 218 may access a mapping maintained by the access control module 218 that indicates one or more entities for which access (of some sensitivity level) is to be allowed or restricted to the particular blockchain. Thus, if a user has previously indicated that an entity is to be allowed access to medium sensitivity data (e.g., a blockchain associated with a medium sensitivity level), but the entity is requesting data of high sensitivity, the access control module 218 may identify (e.g., from the mapping) that the request should be denied based on the requested data being of a higher sensitivity level than the level for which access is to be granted.

Figure 3:
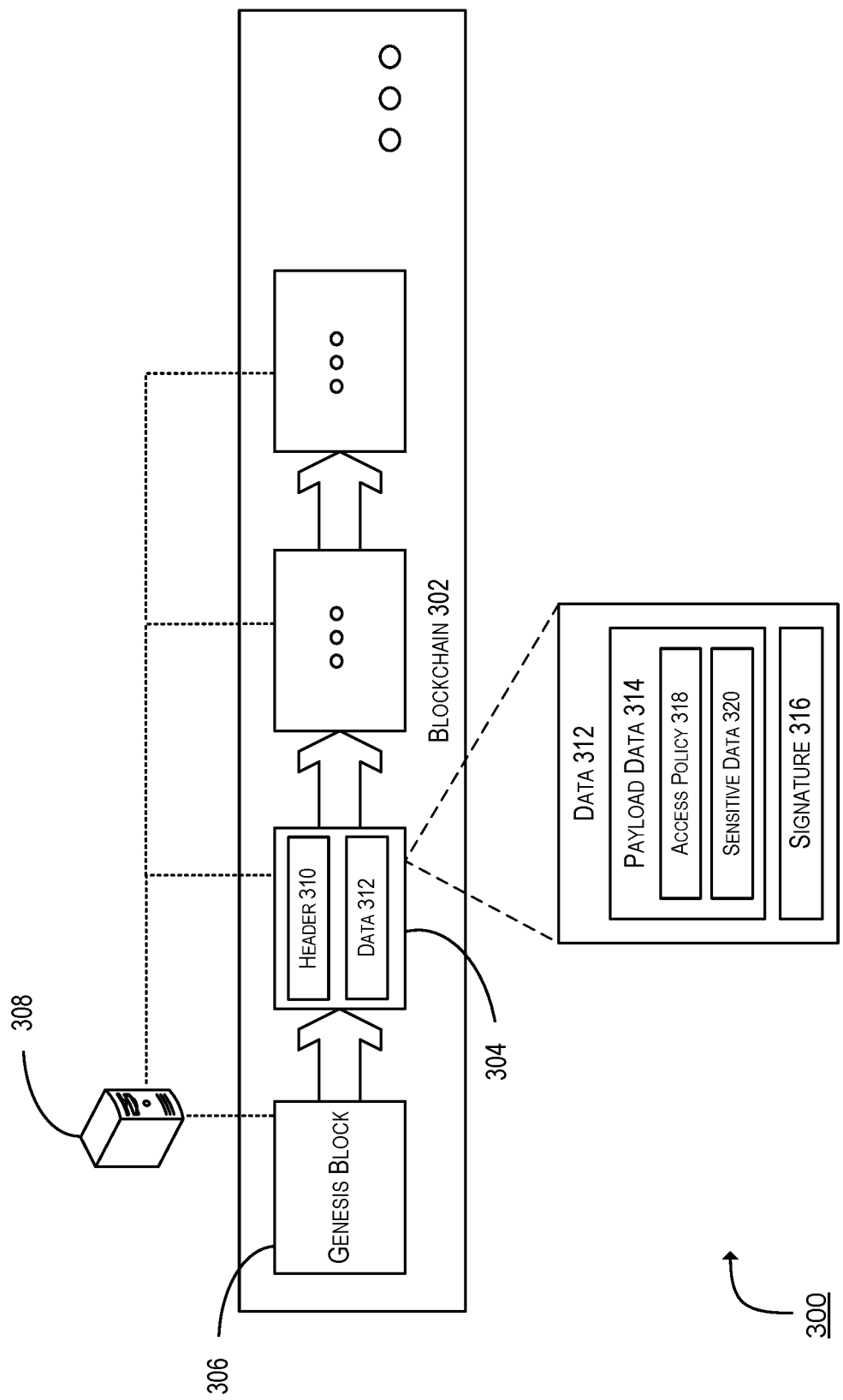
FIG. 3 depicts an example blockchain that may be implemented in accordance with at least one embodiment.

FIG. 3 depicts an example blockchain that may be implemented in accordance with embodiments of the disclosure. In FIG. 3, a blockchain 302 (also known as a blockchain ledger) may comprise a series of records of sensitive data. As depicted, the blockchain may include a number of instances of sensitive data and/or access polices that are processed as blocks, and then distributed to a number of nodes of a centralized or decentralized network as part of the blockchain 302. In particular, the blockchain 302 depicts techniques by which a record of sensitive data and/or access control policies may be stored, altered, and otherwise updated.

As described above, the blocks of the blockchain 302 may be appended to a genesis block 306. Although a genesis block 306 may be generated for the blockchain 302, the contents of the genesis block 306 may be disregarded in some embodiments. In other embodiments, the genesis block 306 may include an indication of an access control policy associated with the blockchain 302. In some embodiments, one or more separate genesis blocks and/or blockchains may be generated for different sensitivity levels corresponding to a user's data.

As a user requests access control policy updates via a user device, transactions may be generated for each request. Computing device 308 (e.g., an example of the blockchain provider computer 108 of FIG. 1 and 200 of FIG. 2) may be a network node of a blockchain network (e.g., the blockchain network 110 of FIG. 1). Sensitive data may, in turn, be added as blocks to blockchain 302. Each block (e.g., block 304) may include a header 310 and data 312. The header 310 may include a hash of the previous block in the blockchain 302 as well as a nonce value and various other information to be used to verify the block 304.

In some embodiments, the data 312 included in a block (e.g., block 304) may include payload data 314 and a digital signature 316. Payload data 314 may include an access control policy 318 (e.g., indicating one or more entities/users for which access is to the blockchain 302 is to be allowed and/or restricted) and/or sensitive data 320. The payload data 314 may also include any other suitable information. In some embodiments, a computing device 308 may sign any suitable portion of payload data 314 using a cryptographic key associated with the computing device 308 or a cryptographic key associated with the data owner (e.g., the user) to generate the digital signature 316.

Each block 304 of the blockchain 302 can be independently verified by independently generating the hash of the previous block using the given nonce value as well as by verifying the subsequent block. Additionally, each data 312 is verifiable by verifying the digital signature. Blocks of the blockchain 302 can be searched for data pertaining to a particular access control policy, a particular user, or based on any other suitable factor. It should be noted that data recorded in the blockchain 302 may include data particular to a user or entity. In some embodiments, each time that a request to access information is received, the blockchain 302 may record the attempt to access that information. Thus, access control policies may include access limits, in that policies may limit the number of times that a particular entity may access the information of the blockchain 302 within some period of time.

Figure 4:
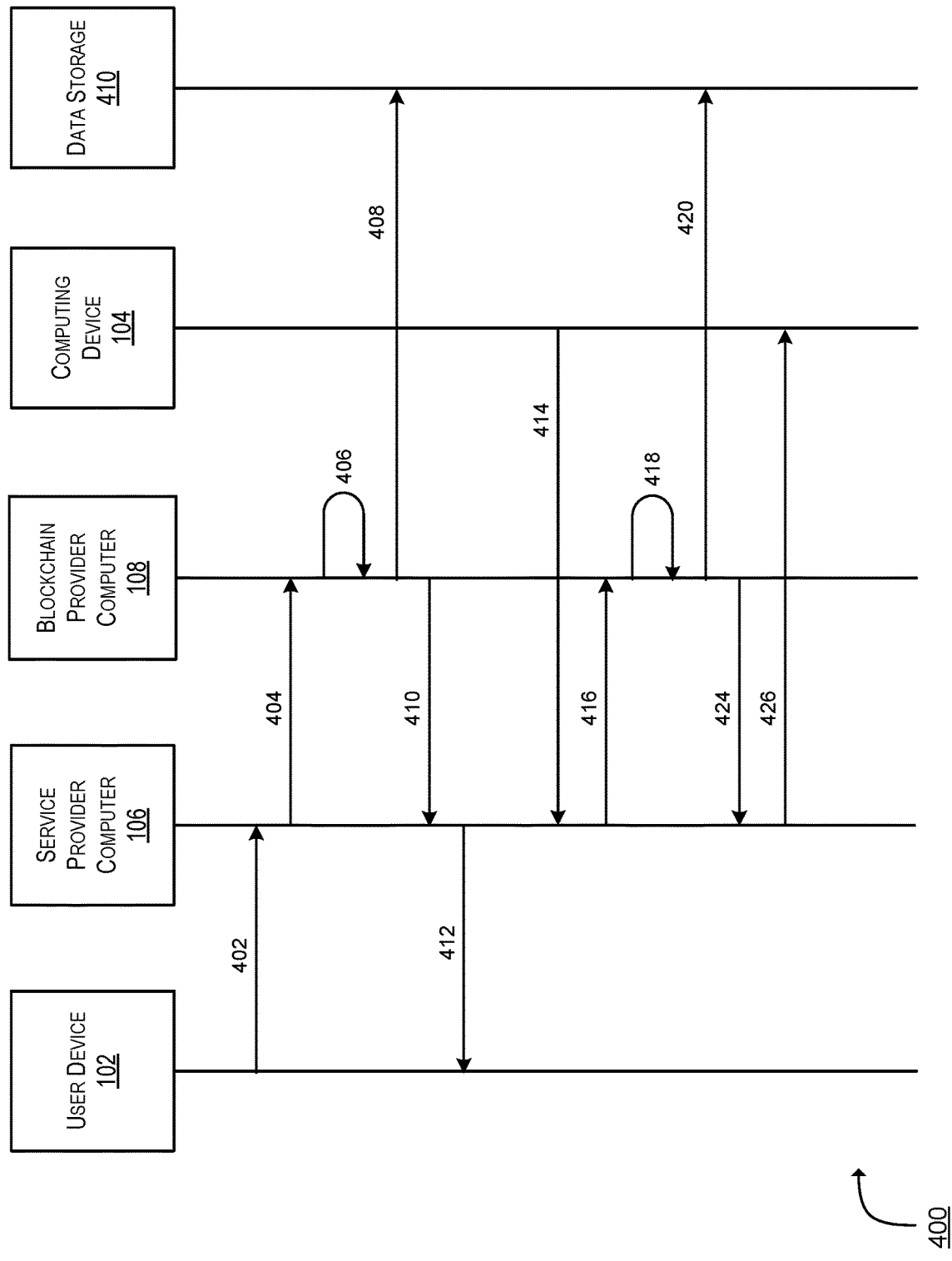
FIG. 4 depicts a swim lane diagram illustrating an exemplary method by which a number of blockchains may be generated, in accordance with at least one embodiment.

FIG. 4 depicts a swim lane diagram illustrating an exemplary method 400 by which a number of blockchains may be generated, in accordance with at least one embodiment.

The method may begin at 402, where a user device 102 may transmit to service provider computer 106, a request for blockchain management. In some embodiments, the request may include any suitable data that the user desires to be maintained in one or more blockchains. In some embodiments, the request may designate multiple portions of data and a corresponding sensitivity level associated with each portion. The service provider computer 106 may be configured to provide one or more interfaces with which the request may be initiated.

At 404, the service provider computer 106 may forward the request to the blockchain provider computer 108 via any suitable communications interface (e.g., an application programming interface). It should be appreciated that the blockchain provider computer 108 may be an example of any computing device of the blockchain network 110 of FIG. 1. In some embodiments, the service provider computer 106 and/or the blockchain network 110 (or computing devices of the blockchain network 110 such as the blockchain provider computer 108) may be associated with any suitable entity such as a financial institution, a database administrator, a vital records database, a transaction database, a credit bureau, and/or the like. In some embodiments, the request received from the user may identify particular data that is accessible to the service provider computer 106. In some embodiments, the service provider computer 106 may be configured to insert the requested data in the request before forwarding the request to the blockchain provider computer 108.

At 406, the blockchain provider computer 108 may identify one or more sensitivity levels for the data associated with the request. In some embodiments, the data requested to be maintained in one or more blockchains may not be included in the request. Accordingly, the blockchain provider computer 108 may obtain the data from any suitable source (e.g., from a source identified in the request, from a storage location accessible to the blockchain provider computer, etc.). In some embodiments, the blockchain provider computer 108 may analyze (e.g., utilizing the data sensitivity management module 214 of FIG. 2) the data received and/or obtained to identify one or more sensitivity levels for the data. For example, the blockchain provider computer 108 may utilized a predefined rules set and/or a machine-learning model to identify one or more sensitivity levels corresponding to various portions of the data. The blockchain provider computer 108 may determine if blockchains associated with the user (e.g., a user identifier) and corresponding to the sensitivity levels identified (e.g., high, medium, low, etc.) are already in existence. The blockchain provider computer 108 may generate one or more blockchains corresponding to an identified sensitivity level for which a blockchain was not found. In some embodiments, each blockchain may be a private blockchain for which access allowed or restricted by the blockchain provider computer 108 according to one or more access control policies (e.g., access control policies generated in response to a user request to allow/restrict access to particular data and/or a particular sensitivity level for a particular user/entity). If generated, the blockchain may be assigned a blockchain identifier and the blockchain provider computer 108 may maintain this assignment and an association (e.g., a mapping) between the blockchain identifier, the user identifier, and/or the sensitivity level corresponding to the blockchain. If blockchains that are associated with the user and which correspond to the sensitivity levels are found, the blockchain provider computer 108 may add the data to the blockchain(s) according to the sensitivity level identified.

At 408, the blockchain provider computer 108 may store any generated blockchains and/or mappings (e.g., a mapping between the blockchain identifier, the user identifier, and/or the sensitivity level corresponding to the blockchain) at the data storage 410. The data storage 410 may be any suitable storage location that is accessible to the blockchain provider computer 108. In some embodiments, the data storage 410 may be accessible to any computing device of the blockchain network 110 of FIG. 1.

At 410, the blockchain provider computer 108 may determine that the data/blockchain/mappings may transmit a response to the request indicating the data was successfully or unsuccessfully stored. The response may be forwarded to the user device 102 by the service provider computer 106 at 412.

The operations performed at 414-426 may be similar to the operations performed at 402-412 but with respect to an entity or a different user associated with the computing device 104 (e.g., a user that is different from the user associated with the user device 102). Thus, the blockchain provider computer 108 can maintain one or more blockchains for one or more users and/or entities.

Figure 5:
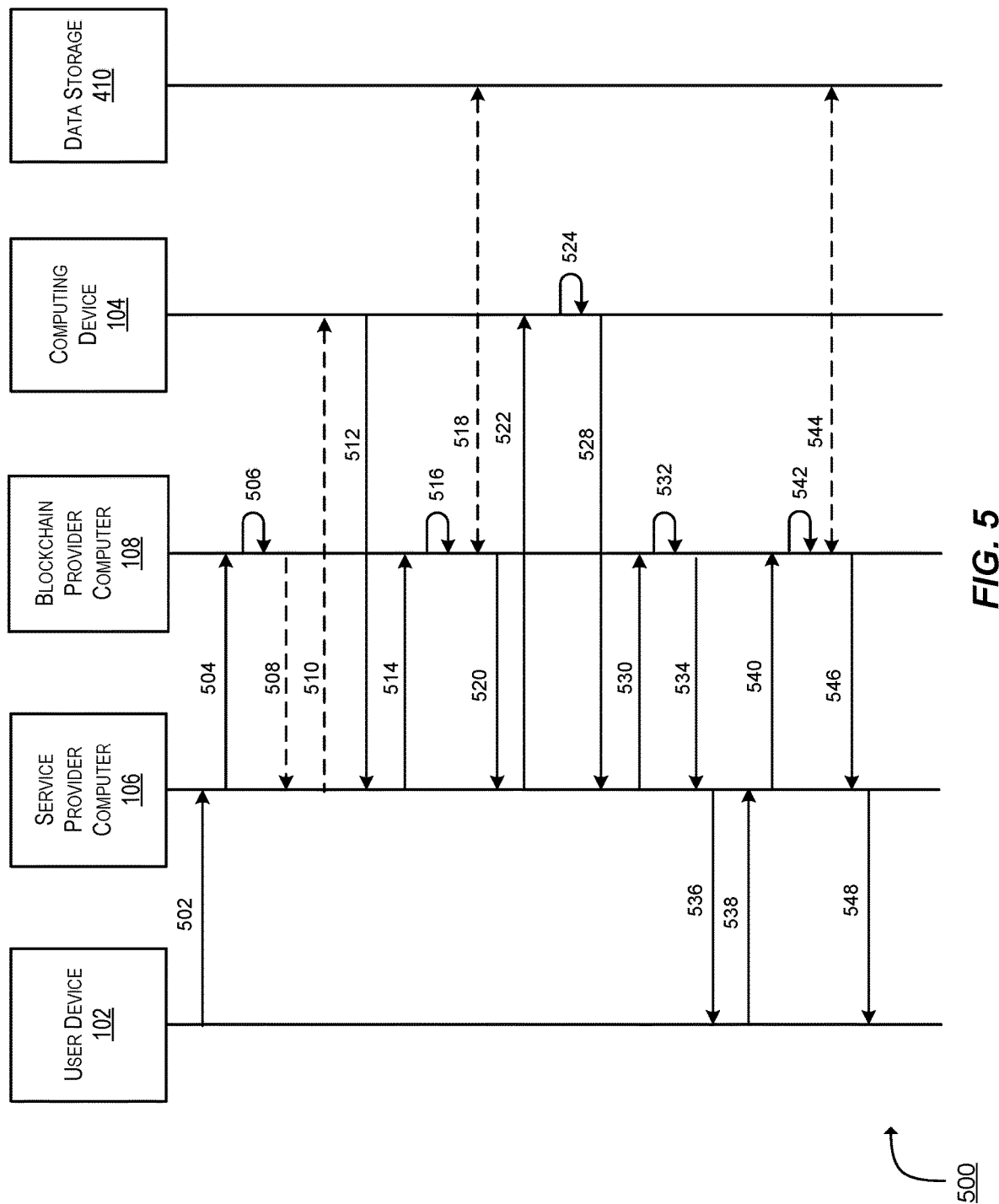
FIG. 5 depicts a swim lane diagram illustrating an exemplary method for accessing sensitive data from one or more blockchains according to one or more access control policies, in accordance with at least one embodiment.

FIG. 5 depicts a swim lane diagram illustrating an exemplary method 500 for accessing sensitive data from one or more blockchains according to one or more access control policies, in accordance with at least one embodiment.

As a non-limiting example, the user device 102 may be operated by a user seeking a loan from an entity associated with the computing device 104. The service provider computer 106 may be, for example, a web server that hosts a web page and/or user interfaces for interacting with the blockchain provider computer 108. As discussed above, the service provider computer 106 and/or the blockchain network 110 (or computing devices of the blockchain network 110 such as the blockchain provider computer 108) may be associated with any suitable entity such as a financial institution, a database administrator, a vital records database, a transaction database, a credit bureau, and/or the like. In some embodiments, the blockchain provider computer 108 can operate, but does not necessarily operate, as part of a processing network. A processing network may include data processing subsystems, networks, and operations used to support and deliver authorization services, exception file services, transaction scoring services, and clearing and settlement services. An exemplary processing network may include VisaNet™. Processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services. The data storage 410 can be local memory of the blockchain provider computer 108 and/or the data storage 410 can be a storage device accessible to the blockchain provider computer 108.

At 502, the user device 102 may transmit a request to allow access to an entity (e.g., an entity associated with the computing device 104) corresponding to particular data (e.g., a particular blockchain associated with a user of the user device 102, data corresponding to a particular sensitivity level, etc.). The request may be received by the service provider computer 106. In some embodiments, the service provider computer 106 may be configured to provide any suitable number of interfaces for exchanging data between the user device 102 and the blockchain provider computer 108 and/or between the computing device 104 and the service provider computer 106.

At 504, the service provider computer 106 may forward the request to the blockchain provider computer 108 via any suitable communications interface (e.g., an application programming interface). It should be appreciated that the blockchain provider computer 108 may be an example of any computing device of the blockchain network 110 of FIG. 1. In some embodiments, the request received from the user may not include but identify particular data that is accessible to the service provider computer 106. In some embodiments, the service provider computer 106 may be configured to insert the requested data in the request before forwarding the request to the blockchain provider computer 108.

At 506, the blockchain provider computer 108 may receive the request and identify from the request data and/or sensitivity levels to which the user has requested access to be allowed/restricted for a particular user/entity. By way of example, the request may indicate that an entity associated with the computing device 104 (e.g., a loan processor) may be provided access to all data associated with a high sensitivity level or lower (e.g., a medium sensitivity level, a low sensitivity level, etc.). In some embodiments, the type of access may be specified as a sensitivity level threshold. For example, if a sensitivity level requested is "high," the entity may be provided access to all data that is of high sensitivity and any data that has a lower sensitivity level (e.g., medium sensitivity, low sensitivity). In some embodiments, the blockchain provider computer 108 may generate one or more access control policies (e.g., data indicating one or more access rules for a particular blockchain and/or user/entity such as permissions and/or authentication rules) corresponding to the request. If an access control policy corresponds with a particular blockchain associated with the user, the blockchain provider computer 108 may perform any suitable functionality to add the access control policy to a block of that particular blockchain. In some embodiments, the access control policy may be maintained in a mapping separate from the blockchain and managed by the blockchain provider computer 108. In some embodiments, the access control policy may be associated in the mapping with a user identifier, an access user identifier (corresponding to the user/entity for which access it to be allowed/restricted), one or more blockchain identifiers (corresponding to the particular blockchain(s) for which access is to be allowed/restricted), a sensitivity level associated with a type of access to be allowed/restricted, a permissions type (e.g., read, write, read/write, restrict, etc.) or any suitable combination of the above.

At 508, the blockchain provider computer 108 may, in some embodiments, transmit a notification to the service provider computer 106 indicating that the entity associated with the computing device 104 has been granted access. The service provider computer 106 may provide this indication to the computing device 104 at 510.

At 512, the computing device 104 (e.g., associated with the loan processor) may transmit a data request for user data (e.g., all data available and accessible by the computing device 104). In some embodiments, the data request may indicate the specific data requested (e.g., contact information such as the user's name, address, phone number, social security number, tax identification number, etc. The data request may include an identifier for the data owner (e.g., a user associated with the user device 102) and an identifier for the requesting user/entity (e.g., an entity associated with the computing device 104).

At 514, the service provider computer 106 may forward the data request to the blockchain provider computer 108. In some embodiments, the computing device 104 can transmit the data request directly to the blockchain provider computer 108 without involving the service provider computer 106. At 516, the blockchain provider computer 108 may identify one or more access control policies associated with the requesting entity/user (e.g., based at least in part on the identifier included in the data request and/or the particular data requested). In some embodiments, the blockchain provider computer 108 may consult a mapping to identify one or more access control policies (e.g., including permissions and/or authentication rules) associated with the user identifier and the request user/entity identifier. If specific data is requested, the blockchain provider computer 108 may allow or restrict access to the specific data according to the access control policies. In some embodiments, the blockchain provider computer 108 may search one or more blockchains associated with the user identifier to identify a particular blockchain and/or sensitivity level associated with the data. In some embodiments, the blockchain provider computer 108 may apply one or more predefined rules to identify a sensitivity level associated with the data requested. If blockchain provider computer 108 identifies the sensitivity level of the data requested, the blockchain provider computer 108 may allow or restrict access to said data based on the one or more access control policies associated with the requesting user/entity. If specific data is not requested, the blockchain provider computer 108 may allow or restrict access to one or more blockchains associated with the data owner according to the access control policies associated with the requesting entity/user. In some embodiments, the blockchain provider computer 108 may access the one or more blockchains associated with the data owner at 518. In some embodiments, accessing the one or more blockchains associated with the data owner may include obtaining the one or more blockchains from the data storage 410. In some embodiments, the blockchain provider computer 108 may access the one or more access control policies from the one or more blockchains associated with the data owner to identify whether access for the requesting user/entity should be allowed or restricted.

In some embodiments, when it is determined that access to the requested data is to be allowed (e.g., based on the access control policies associated with the data owner, the blockchain(s), and the requesting entity/user), the blockchain provider computer 108 may transmit the blockchain(s) to the service provider computer 106 at 520. The transmission (e.g., the response to the data request) may include an encryption key used to encrypt the blocks of each blockchain provided. In some embodiments, the blockchain provider computer 108 could transmit the blockchain(s) directly to the computing device 104 (or provide a storage location from which the computing device 104 can access).

At 522, the service provider computer 106 may forward the response to the computing device 104. At 524, the computing device 104 may optionally verify the integrity of the blockchain(s) by re-computing the hash of each block according to a blockchain protocol. In some embodiments, the blockchain(s) are verified by the blockchain provider computer 108 prior to sending the blockchain(s).

It should be appreciated that, in some embodiments, the blockchains are not sent to the requesting device. Instead, the data contained in the accessible blockchain(s) may be sent to the computing device 104.

Operations 528-548 generally correspond to operations performed at 502-524 but relate to generating/updating access control policies associated with the user associated with the user device 102 to one or more blockchains of the entity associated with the computing device 104.

Utilizing the techniques above, the user device 102 and/or the computing device 104 may exchange blockchain(s) (e.g., directly from each other or through service provider computer 106). In such instances, the received blockchain(s) may be sent to the blockchain provider computer 108 in a data request including an identifier of the data owner and an identifier of the data requestor. The blockchain provider computer 108 may utilize the received blockchain (or stored access control policies) to allow or restrict access to the blockchain(s) received. In some embodiments, if access is to be allowed, the blockchain provider computer 108 may provide an encryption key with which the requesting device may access the data stored in the blockchain or the blockchain provider computer 108 may extract the requested data and send the data to the requesting device.

As a non-limiting example, a user wanting a loan from a loan provider may provide access to the loan provider to some portion of the user's sensitive data. For example, the user could request that the blockchain provider computer 108 allow the loan processor (e.g., associated with the computing device 104) to access data corresponding to one or more sensitivity levels. It may be the case that the user has transaction data corresponding to banking transaction stored in a low sensitivity blockchain, address and contact information stored in a medium sensitivity blockchain, and tax returns, a social security number, etc. stored in a high sensitivity blockchain. The loan processor could then access the user's data to identify proposed terms for a loan. In some embodiments, the loan processor could electronically (or otherwise) send an offer (e.g., a loan offer with particular terms and conditions) to the user (e.g., via the user device 102).

In some embodiments, before/or after the user provides access to the loan provider, the user may request/obtain access to the loan provider's sensitive data in order to access the reputation of the loan provider. In some embodiments, the loan provider's sensitive data could include data corresponding to information regarding past loans provided, quarterly reports, annual reports, or any suitable data from which the loan provider's reputation may be assessed. The loan provider's sensitive data could correspond to any suitable combination of low, medium, or high sensitivity levels. In some embodiments, the user may request access and the loan provider may grant or deny access utilizing the blockchain provider computer 108 in a similar manner as described above. In some embodiments, data associated with a low sensitivity level may be accessed by any entity, including the user/user device 102, without previously obtaining explicit permission from the loan processor. The user device 102 may utilize the loan provider's sensitive data to assess the reputation of the loan provider in any suitable manner. In some embodiments, the user device 102 may present the loan provider's sensitive data to the user for assessment.

As another example, a resource provider (e.g., a merchant) associated with the computing device may request and/or obtain access to the sensitive data of the user associated with the user device 102. In some embodiments, the resource provider may request (e.g., from the blockchain provider computer 108) access to public data (e.g., data corresponding to a low sensitivity level) associated with the user and managed by the blockchain network 110 of FIG. 1. In some embodiments, accessing public data (low sensitivity level data) may not require advance permission to be sought from the user. In some embodiments, the resource provider could request data corresponding to any suitable sensitivity level (e.g., low, medium, and/or high). The user may allow/restrict access to the resource provider as described at steps 502-506. If the resource provider is allowed access to data, the resource provider may utilize that data to identify one or more offers. As a non-limiting example, the resource provider may be provided access to some of the user's transaction data (e.g., public data indicating a variety of transactions performed by the user such as a purchase at a coffee shop, a purchase at a clothing retailer, a purchase at a rental car company, etc.). Using this transaction data, the resource provider (e.g., the computing device 104) may identify the user as being associated with one or more offers. By way of example, the resource provider may be a clothing retailer and may be currently offering a discount for a particular pair/brand of shoes. As the user's transaction data indicates a clothing purchase, the resource provider may identify the offer for the shoe discount as being pertinent to the user. Accordingly, the resource provider may transmit the offer for the shoe discount to the user (e.g., via the user device 102). As another example, the resource provider could be a travel booking entity. Because the user's transaction data indicated a rental car purchase, the resource provider could identify the user as potentially being interested in rental car offers. Accordingly, the resource provider could transmit an offer corresponding to a rental car to the user. The number and type of offers are numerous and vary. These techniques can apply to any suitable resource provider and/or any suitable offer not just those provided as examples herein.

FIG. 6 depicts a swim lane diagram illustrating another exemplary method 600 for accessing sensitive data from one or more blockchains according to one or more access control policies, in accordance with at least one embodiment. It should be appreciated that the user device 102 and the blockchain provider computer 108 may be in communication with one another, as are the computing device 104 and the blockchain provider computer 108. Accordingly, FIG. 6 is intended to depict one or more use cases in which the blockchain provider computer 108 provides one or more interfaces enabling interactions to occur directly between the devices depicted in FIG. 6. In these use cases, the functionality of the service provider computer 106 discussed above is not utilized.

The method 600 may begin at 602, the user device 102 may transmit a request to allow (or restrict) access to particular data (and/or data corresponding to a particular sensitivity level) to a particular entity/user (or entities/users).

At 604, the blockchain provider computer 108 may receive the data request. It should be appreciated that the blockchain provider computer 108 may be an example of any computing device of the blockchain network 110 of FIG. 1. As discussed above, the blockchain network 110 (or computing devices of the blockchain network 110 such as the blockchain provider computer 108) may be associated with any suitable entity such as a financial institution, a database administrator, a vital records database, a transaction database, a credit bureau, and/or the like. In some embodiments, the request received from the user may identify particular data that is accessible to the blockchain provider computer 108 (e.g., one or more blockchains, one or more sensitivity levels). The blockchain provider computer 108 may identify from the request particular data and/or sensitivity levels to which the user has requested access to be allowed/restricted for a particular user/entity. By way of example, the request may indicate that an entity associated with the computing device 104 (e.g., a loan processor) may be provided access to all data associated with a high sensitivity level or lower (e.g., a medium sensitivity level, a low sensitivity level, etc.). In some embodiments, the blockchain provider computer 108 may generate one or more access control policies (e.g., data indicating one or more access rules for a particular blockchain and/or user/entity) corresponding to the request. If an access control policy corresponds with a particular blockchain associated with the user, the blockchain provider computer 108 may perform any suitable functionality according to a blockchain protocol to add the access control policy to a block of that particular blockchain. In some embodiments, the access control policy may be maintain in a mapping separate from the blockchain and managed by the blockchain provider computer 108. In some embodiments, the access control policy may be associated in the mapping with a user identifier, an access user identifier (corresponding to the user/entity for which access it to be allowed/restricted), one or more blockchain identifiers (corresponding to the particular blockchain(s) for which access is to be allowed/restricted), a sensitivity level associated with a type of access to be allowed/restricted, or any suitable combination of the above.

At 608, the blockchain provider computer 108 may, in some embodiments, transmit a notification to the user device 102 indicating that the request has been successfully or unsuccessfully processed.

At 610, the user device 102 may optionally transmit a message to the computing device 104 (e.g., associated with a loan process) including an identifier associated with the user (the data owner) and an indication that data is available at the blockchain provider computer 108.

At 612, the computing device 104 may transmit a data request for user data (e.g., all data available and accessible by the computing device 104) to the blockchain provider computer 108. In some embodiments, the data request may indicate the specific data requested (e.g., contact information such as the user's name, address, phone number, social security number, tax identification number, etc.). The data request may include an identifier for the data owner (e.g., the user associated with the user device 102) and an identifier for the requesting user/entity (e.g., an entity associated with the computing device 104).

At 614, the blockchain provider computer 108 may identify one or more access control policies associated with the requesting entity/user (e.g., based at least in part on the identifier included in the data request and/or the particular data requested). In some embodiments, the blockchain provider computer 108 may consult a mapping to identify one or more access control policies associated with the user identifier and the request user/entity identifier. If specific data is requested, the blockchain provider computer 108 may allow or restrict access to the specific data according to the access control policies. In some embodiments, the blockchain provider computer 108 may search one or more blockchains associated with the user identifier to identify a particular blockchain and/or sensitivity level associated with the data. In some embodiments, the blockchain provider computer 108 may apply one or more predefined rules to identify a sensitivity level associated with the data requested. However, the blockchain provider computer 108 identifies the sensitivity level of the data requested, the blockchain provider computer 108 may allow or restrict access to said data based on the one or more access control policies associated with the requesting user/entity. In some embodiments, the blockchain provider computer 108 may access the one or more blockchains associated with the data owner at 616. In some embodiments, accessing the one or more blockchains associated with the data owner may include obtaining the one or more blockchains from the data storage 410. In some embodiments, the blockchain provider computer 108 may access the one or more access control policies from the one or more blockchains associated with the data owner to identify whether access for the requesting user/entity should be allowed or restricted.

At 618, when it is determined that access to the requested data is to be allowed (e.g., based on the access control policies associated with the data owner, the blockchain(s), and the requesting entity/user), the blockchain provider computer 108 may transmit the blockchain(s) to the computing device 104. The transmission (e.g., a response to the data request) may include an encryption key used to encrypt the blocks of each blockchain provided. In some embodiments, the blockchain provider computer 108 may extract the data from the blockchain(s) and send only the data rather than the blockchain(s) in their entirety.

TECHNICAL ADVANTAGES

Embodiments of the disclosure provide for a number of technical advantages over conventional systems. For example, embodiments of the disclosure enable a user to dictate how his or her information is distributed and used in a secure manner. The use of a blockchain in the manners described provides the user with the ability to manage information usage policies in a secure, immutable, and verifiable manner. This, in turn, enables trusted transactions to be performed in a distributed environment that includes entities that are not necessarily trusted. Additionally, embodiments of the system are able to maintain a record of how that user's data is actually being used, providing greater transparency to the user.

Furthermore, while embodiments of the described system enable efficient computing on sensitive data, they do not require that computing to be performed locally. In fact, the system enables computations to be performed on sensitive data even by untrusted entities. The use of private enclaves in the manner described to perform various processing enables an untrusted entity to work with sensitive data without actually gaining access to that sensitive data.

Additionally, the system described herein is configured to provide simultaneous release of the sensitive data to different data consumers. This prevents collusion between one or more data consumers and a host computer on which the data is computed. Collusion can be harmful to consumers when data is not distributed simultaneously. For example, in the scenario in which data consumers are competitors for the consumer's business, if a data consumer receives user data before other data consumers (or if the other data consumers do not receive the user data at all), then the consumer may be forced to accept an offer from that data consumer, even when that offer is not in the best interests of the consumer. The described system prevents this by ensuring that all consumers of the user's data receive that data simultaneously or not at all.

Embodiments of the invention also improve processing speed relative to conventional blockchain systems. For example, a conventional blockchain system may contain the data of all users of a system. To verify a blockchain that contains interactions conducting by a single user, data in the entire blockchain needs to be verified. When there are thousands of interactions by millions of users on a single blockchain, verifying the the blockchain can take a significant amount of time.

In embodiments of the invention, however, interactions or data specifically associated with a single user are stored in a single blockchain associated with that single user. The data to be verified is significantly less than the data that would need to be verified on a conventional blockchain. This results in an improvement in processing speed relative to conventional blockchain verification processes.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
obtaining, by a blockchain provider computer, sensitive data associated with a first entity;
generating, by the blockchain provider computer, one or more personal blockchains associated with the first entity, the one or more personal blockchains storing corresponding portions of the sensitive data associated with the first entity;
managing, by the blockchain provider computer, access to the one or more personal blockchains associated with the first entity according to one or more access control policies;
receiving, by the blockchain provider computer from a computing device associated with a second entity, an access request to access the one or more personal blockchains associated with the first entity, the access request comprising a second personal blockchain associated with the second entity;
performing, by the blockchain provider computer, a risk analysis based at least in part on the second personal blockchain associated with the second entity; and
allowing, by the blockchain provider computer, access by the computing device to the one or more personal blockchains associated with the first entity based at least in part on the access control policies and the risk analysis of the second personal blockchain associated with the second entity.

2. The method of claim 1, wherein the one or more personal blockchains associated with the first entity comprise a low risk blockchain, a medium risk blockchain, and a high risk blockchain.

3. The method of claim 2, wherein the low risk blockchain, the medium risk blockchain, and the high risk blockchain comprise different sets of data fields corresponding to a same transaction.

4. The method of claim 2, wherein the low risk blockchain, the medium risk blockchain, and the high risk blockchain comprise different sets of data fields corresponding to different levels of sensitivity.

5. The method of claim 1, wherein the one or more personal blockchains comprise a first personal blockchain comprising first sensitive data and a third personal blockchain comprising second sensitive data, and wherein the first sensitive data is more sensitive than the second sensitive data.

6. The method of claim 5, wherein the one or more personal blockchains associated with the first entity are each a permissioned blockchain managed by the blockchain provider computer.

7. The method of claim 1, wherein managing access to the one or more personal blockchains associated with the first entity further comprises:
receiving, by the blockchain provider computer from a second computing device associated with the first entity, access data identifying the second entity as being granted access to corresponding sensitive data associated with a sensitivity level;
identifying, by the blockchain provider computer, the one or more personal blockchains associated with the first entity as comprising data that corresponds with the sensitivity level; and
updating, by the blockchain provider computer, at least one access control policy associated with the one or more personal blockchains to indicate the second entity is granted access to the one or more personal blockchains.

8. The method of claim 1, further comprising:
receiving, by the blockchain provider computer from a second computing device associated with a third entity, a second access request to access the one or more personal blockchains associated with the first entity;
verifying, utilizing the access control policies, that the third entity has not been granted access to the one or more personal blockchains associated with the first entity; and
denying, by the blockchain provider computer, the second access request based at least in part on the access control policies.

9. The method of claim 1, wherein the sensitive data may comprise at least one of: user identification information, user contact information, or transaction information associated with a user.

10. The method of claim 1, wherein generating the one or more personal blockchains associated with the first entity further comprises:
    identifying, using a predefined rules set, a first sensitivity level associated with a first portion of the sensitive data;
    generating a first personal blockchain associated with the first entity, the first personal blockchain being associated with the first sensitivity level; and
    adding the first portion of the sensitive data to the first personal blockchain.

11. The method of claim 10, wherein generating the one or more personal blockchains associated with the first entity further comprises:
    identifying, using the predefined rules set, a second sensitivity level associated with a second portion of the sensitive data;
    generating a third personal blockchain associated with the first entity, the third personal blockchain being associated with the second sensitivity level; and
    adding the second portion of the sensitive data to the third personal blockchain, wherein the first sensitivity level indicates a higher degree of sensitivity than the second sensitivity level.

12. The method of claim 1, wherein allowing access by the computing device to the one or more personal blockchains associated with the first entity further comprises transmitting, by the blockchain provider computer to the computing device, the one or more personal blockchains associated with the first entity, wherein transmitting the one or more personal blockchains to the computing device causes the computing device to verify the one or more personal blockchains utilizing an encryption key provided by the blockchain provider computer.

13. A blockchain provider computer, comprising:
    a processor;
    a memory; and
    a computer readable medium coupled to the processor, the computer readable medium comprising code that, when executed by the processor, causes the blockchain provider computer to:
        obtain sensitive data associated with a first entity;
        generate one or more personal blockchains associated with the first entity, the one or more personal blockchains storing corresponding portions of the sensitive data associated with the first entity;
        manage access to the one or more personal blockchains associated with the first entity according to one or more access control policies;
        receive, from a computing device associated with a second entity, an access request to access the one or more personal blockchains associated with the first entity, the access request comprising a second personal blockchain associated with the second entity;
        perform a risk analysis based at least in part on the second personal blockchain associated with the second entity; and
        allow access by the computing device to the one or more personal blockchains associated with the first entity based at least in part on the access control policies and the risk analysis of the second personal blockchain associated with the second entity.

14. The blockchain provider computer of claim 13, wherein the one or more personal blockchains associated with the first entity comprise a low risk blockchain, a medium risk blockchain, and a high risk blockchain, wherein the low risk blockchain, the medium risk blockchain, and the high risk blockchain comprise different sets of data fields corresponding to a same transaction, and wherein the low risk blockchain, the medium risk blockchain, and the high risk blockchain comprise different sets of data fields corresponding to different levels of sensitivity.

15. The blockchain provider computer of claim 13, wherein managing access to the one or more personal blockchains associated with the first entity further causes the blockchain provider computer to:
    receive, from a second computing device associated with the first entity, access data identifying the second entity as being granted access to corresponding sensitive data associated with a sensitivity level;
    identify the one or more personal blockchains associated with the first entity as comprising data that corresponds with the sensitivity level; and
    update at least one access control policy associated with the one or more personal blockchains to indicate the second entity is granted access to the one or more personal blockchains.

16. The blockchain provider computer of claim 13, wherein executing the code further causes the blockchain provider computer to:
    receive, from a second computing device associated with a third entity, a second access request to access the one or more personal blockchains associated with the first entity;
    verify, utilizing the access control policies, that the third entity has not been granted access to the one or more personal blockchains associated with the first entity; and
    deny the second access request based at least in part on the access control policies.

* * * * *